UNITED STATES PATENT OFFICE.

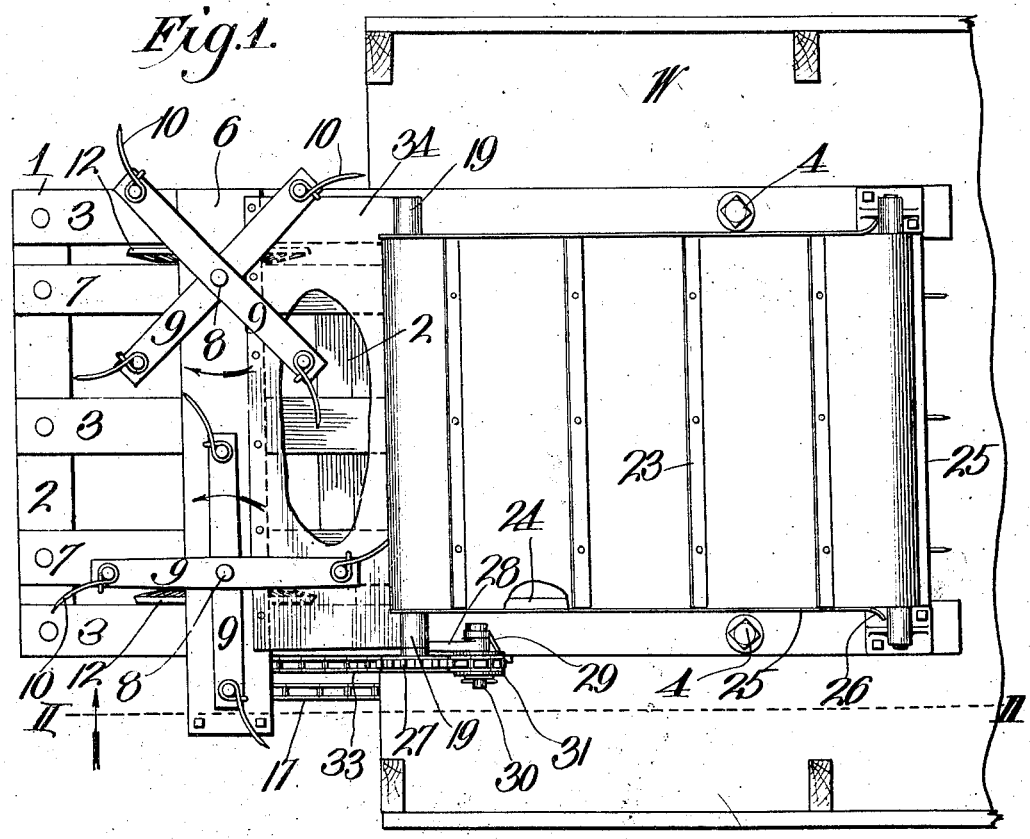

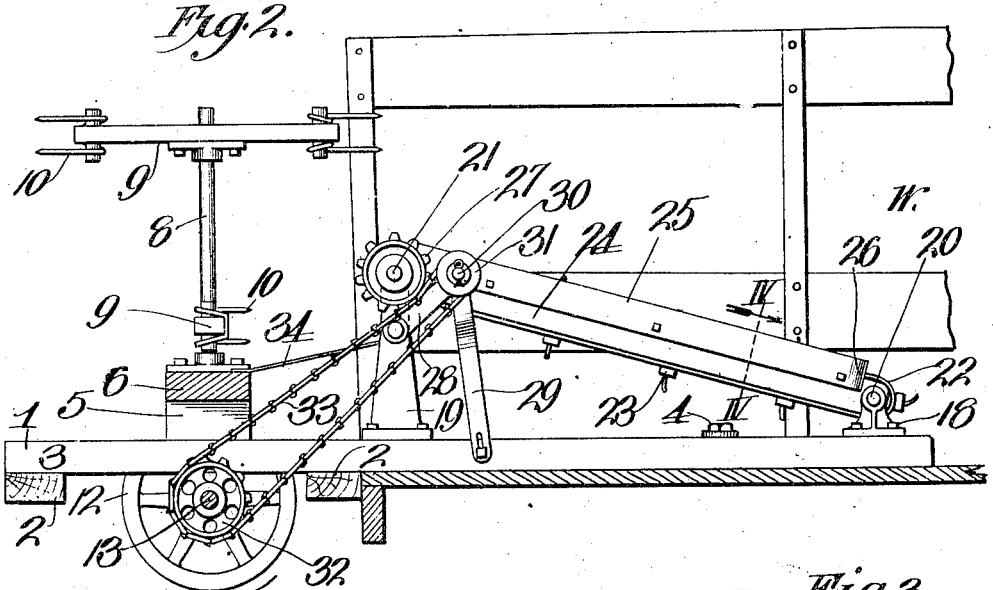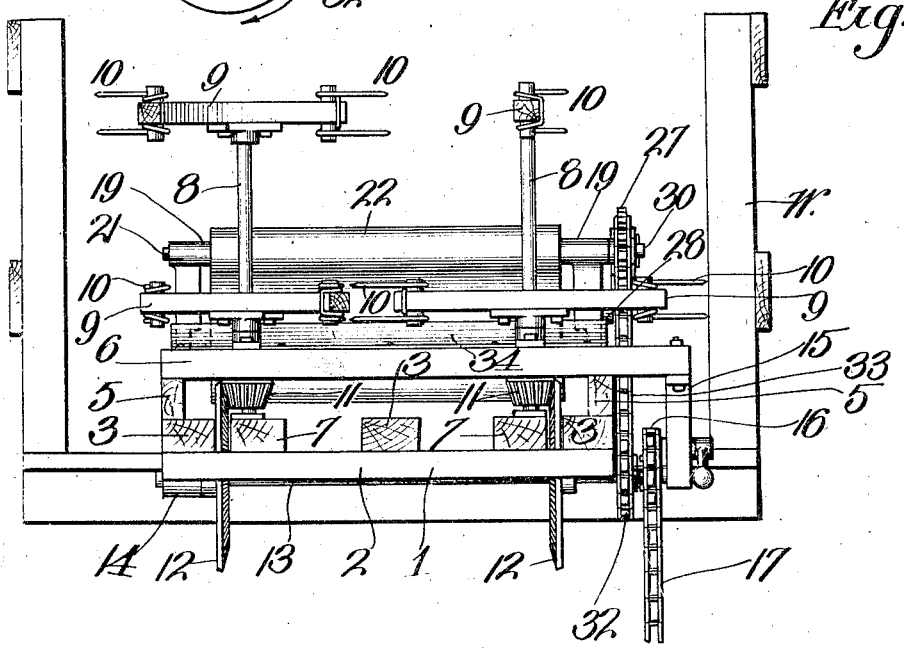

LEWIS D. RICE, OF KANSAS CITY, MISSOURI, ASSIGNOR TO SIMPLEX SPREADER MANUFACTURING COMPANY, OF KANSAS CITY, MISSOURI, A CORPORATION OF MISSOURI.

STRAW-SPREADER.

1,082,820.   Specification of Letters Patent.   Patented Dec. 30, 1913.

Application filed December 24, 1912.  Serial No. 738,399.

*To all whom it may concern:*

Be it known that I, LEWIS D. RICE, a citizen of the United States, residing at Kansas City, in the county of Jackson and State of Missouri, have invented certain new and useful Improvements in Straw-Spreaders, of which the following is a specification.

This invention relates to straw spreaders of that type exemplified by the Patent No. 1037038 issued Aug. 27, 1912, for straw spreaders to Simplex Spreader Mfg. Co., of Kansas City, Mo., and my object is to produce means for feeding the straw continuously to the straw spreading arms so that the straw shall be distributed uninterruptedly and uniformly, it having been found impracticable for men standing in a wagon equipped with the spreading attachment to fork the straw with sufficient rapidity to the straw spreading arms to insure a fairly even distribution or spreading of the straw upon the ground.

With this general object in view the invention consists in certain novel and peculiar features of construction and organization as hereinafter described and claimed; and in order that it may be fully understood reference is to be had to the accompanying drawings, in which—

Figure 1, is a top plan view of a wagon equipped with a straw spreader embodying my invention. Fig. 2, is a vertical section on the line II—II of Fig. 1. Fig. 3, is a rear view. Fig. 4, is a section on the line IV—IV of Fig. 2.

To facilitate a proper understanding of the construction of the straw spreader, the parts corresponding to parts of the patented device are identified by like reference characters.

Referring now to the drawings in detail, 1 is a frame constructed as follows: 2 is a pair of parallel cross bars connected by a plurality of longitudinally extending bars 3, which project a considerable distance beyond the foremost cross bar 2, and the bars are so proportioned that the front cross bar 2 may bear against the rear end of the bottom of the wagon W, or other vehicle, and the bars 3 extend into the wagon body and rest upon the bottom thereof. To secure the frame rigidly in position, the forwardly extending portions of the bars 3, are bolted at 4, to the bottom of the wagon body.

5 is a pair of blocks secured upon the outermost bars 3, and connecting said blocks is a cross bar 6. Connecting the bars 2, inward of the plane of the blocks 5, is a pair of bars 7, forming journals for the lower ends of a pair of vertical shafts 8, also journaled in cross bar 6. Each shaft 8 is provided with one or more radial arms 9, and each arm 9 is equipped at its end with a horizontally arranged fork 10, the same being preferably made of wire. The shafts are provided near their lower ends with bevel gears 11, meshing with larger gears 12 secured on a transverse shaft 13, journaled at one end in a bearing 14, depending from one of the outermost bars 3.

15 is a bracket depending from the right hand or projecting end of cross bar 6 and forming a journal for the other end of shaft 13, and secured on said shaft at the inner side of said bracket is a sprocket wheel 16 engaged by a chain 17 to be driven by a master sprocket wheel, not shown, rigid with the adjacent rear wheel (not shown) of the wagon, it being understood that there is provided a suitable clutch mechanism, not detailed or described, whereby the shaft 13 can be thrown into or out of gear with said master sprocket wheel. The clutch mechanism may be of the type shown in the patent hereinbefore referred to or of any other suitable or preferred type.

In feeding spreaders of the type shown by said patent, it has been impossible for men to fork the straw with sufficient rapidity into the field of action of the arms 9, and to make the machine thoroughly effective it was necessary to provide for the automatic feeding to the forked arms 9. To accomplish this purpose and to provide for feeding a substantially equal volume of straw to the upper and lower forked arms 9, it has been found desirable to employ an upwardly and rearwardly inclined endless elevator, the same being so constructed that straw cannot become entangled with it and clog its operation.

Referring now to the elevator in detail:— 18 indicates a pair of bearing brackets secured upon the front ends of the outermost bars 3, and 19 a pair of bearing standards secured upon the said bars adjacent to the rear end of the wagon body. 20 and 21 are shafts journaled in said standards, shaft 21 in a plane between the upper and lower fork-carrying arms 9, and connecting said shafts is an endless apron or elevator 22, equipped at suitable intervals with toothed slats 23. 24 are side bars fitting loosely on the shafts and between the marginal portions of the upper and lower strands of the apron for the purpose of preventing straw from getting between said strands. 25 is a pair of guard strips secured on bars 24 and projecting beyond the upper strand of the apron as a guard against lateral creeping thereof, the front ends of said bars being bent outwardly at 26 to provide a flaring mouth and thus avoid any chance of any of the toothed slats 25, through a slight lateral creeping of the apron, striking against the front ends of the guard strips and resulting in injury to the belt or some other part of the spreader. At its right hand end shaft 21 is equipped with a sprocket wheel 27, and converging upwardly from the adjacent standard 19 and the adjacent side bar 3, respectively, are bars 28 and 29, the same being connected at their upper ends by pivot pin 30, on which is mounted a flanged roller 31, and extending around said roller to a sprocket wheel 32 mounted rigidly on shaft 13, is a chain 33, the bars 28 and 29 so supporting the roller 31 that the chain 33 is held in mesh with the sprocket wheel 27 so that the operation of the chain shall impart rearward travel to the upper strand of the elevator.

To guard against any straw dropping down between bars 3 and 7 rearward of the wagon body, a plate 34 is secured to bar 7 and extends from the same to the standards 19.

As the wagon loaded with straw is drawn across the field upon which the straw is to be spread, motion is transmitted from one of the rear wheels of the wagon through chain 33 to sprocket wheel 16 and from the latter through the clutch mechanisms, to shaft 13. The operation of shaft 13, in the direction indicated by the arrow, Fig. 2, imparts rotation through intermeshing wheels 12 and 11 to shafts 8 carrying the fork-equipped arms 9, so that the latter are revolved rapidly in the direction indicated by the arrows Fig. 1. The operation of shaft 13 also transmits power through chain 33 and sprocket wheel 27, to the endless elevator 22, so that the straw falling or pitched upon the same shall be fed to the rotary arms 9, continuously and in a substantially uniform quantity in order that said arms shall throw the straw rearwardly and laterally in opposite directions for a considerable distance and incidentally distribute it evenly and thereby avoid the necessity of going over the same ground twice in the straw spreading operation. The action of the arms 9 is so rapid that either the upper or lower set will catch and throw almost every bit of the straw that is discharged by the elevator, and the plate 34 serves to retain any straw which may miss the lower arms until removed by the latter on the next revolution, so that no straw can drop down between the front cross bar 2 and shaft 13. The plate 34 also tends to guard against the teeth of the slats carrying the straw around shaft 21 and dropping it down upon the bottom of the wagon below the elevator.

From the above description it will be apparent that I have produced a straw spreader embodying the features of advantage enumerated as desirable, and I wish it to be understood that I reserve the right to make all changes falling within the spirit and scope of the invention as defined in the appended claims.

I claim:—

1. A straw spreader, comprising a frame adapted to be supported upon a vehicle bed, straw-spreading means supported near one end of said frame, and an inclined belt conveyer for lifting straw from the vehicle and feeding the same to said spreading means.

2. A straw spreader, comprising a frame adapted to be supported upon a vehicle bed, straw-spreading means supported near one end of said frame, an endless belt conveyer supported in an inclined position between said spreading means and the other end of the frame for feeding straw from the vehicle to the spreading means, and means for driving the conveyer and spreading means from one of the vehicle wheels.

3. The combination with a vehicle, a frame projecting rearward from the vehicle, a shaft journaled on said frame, a vertical shaft geared to the first-named shaft, an arm secured to the vertical shaft to rotate horizontally, means to drive the first-named shaft, and a suitably driven inclined conveyer also supported on said frame for elevating straw rearwardly in the vehicle and discharging it within the range of action of said rotary arm.

4. The combination with a vehicle, a frame projecting rearward from the vehicle, a shaft journaled on said frame, a vertical shaft geared to the first-named shaft, an arm secured to the vertical shaft to rotate horizontally, means to drive the first-named shaft, an endless elevator carried by said frame and extending longitudinally within the vehicle at its rear end, and means for transmitting power from the first-named shaft to said elevator to cause the latter to carry straw placed upon it to and discharge it into the range of action of said rotary arm.

5. The combination with a vehicle, a frame projecting rearward from the vehicle, a shaft journaled on said frame, a vertical shaft geared to the first-named shaft, an arm secured to the vertical shaft to rotate horizontally, means to drive the first-named shaft, an endless elevator carried by said frame and extending longitudinally within the vehicle at its rear end, means for transmitting power from the first-named shaft to the said elevator to cause the latter to carry straw placed upon it to and discharge it into the range of action of said rotary arm, and a plate underlying the rear end of the elevator and extending rearwardly therefrom below the plane of action of said rotary arm.

6. The combination with a vehicle, a frame projecting rearwardly therefrom, a transverse shaft journaled on said frame rearward of the vehicle, a pair of vertical shafts journaled in said frame and geared at their lower ends to the first-named shaft, rotary arms secured upon each of said shafts, means for driving the first-named shaft, an endless elevator mounted upon said frame within the vehicle and extending upwardly and rearwardly and adapted to discharge straw within the range of action of said rotary arms, and means for transmitting power from said first-named shaft to said endless elevator.

7. The combination with a vehicle, of a frame carried by and projecting from the rear end of the vehicle, a driven shaft journaled on said frame, an upright shaft journaled on the frame rearward of the vehicle and geared at its lower end to the first-named shaft, an arm projecting from the upright shaft to rotate in a substantially horizontal plane, an inclined belt conveyer mounted on said frame within the vehicle for elevating straw from the latter to said arm, and means for transmitting power from the driven shaft to said conveyer.

In testimony whereof I affix my signature, in the presence of two witnesses.

LEWIS D. RICE.

Witnesses:
HELEN C. RODGERS,
G. Y. THORPE.